(12) United States Patent
Bronicki

(10) Patent No.: US 9,920,749 B2
(45) Date of Patent: Mar. 20, 2018

(54) METHOD AND APPARATUS FOR PRODUCING POWER FROM TWO GEOTHERMAL HEAT SOURCES

(71) Applicant: ORMAT TECHNOLOGIES, INC., Reno, NV (US)

(72) Inventor: Lucien Y. Bronicki, Yavne (IL)

(73) Assignee: ORMAT TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 13/935,792

(22) Filed: Jul. 5, 2013

(65) Prior Publication Data

US 2015/0007565 A1 Jan. 8, 2015

(51) Int. Cl.
*F03G 7/04* (2006.01)
*F24J 3/08* (2006.01)
*F01K 25/08* (2006.01)

(52) U.S. Cl.
CPC ............... *F03G 7/04* (2013.01); *F01K 25/08* (2013.01); *F24J 3/08* (2013.01); *F24J 3/081* (2013.01); *F24J 3/085* (2013.01); *F24J 3/086* (2013.01); *Y02E 10/10* (2013.01); *Y02E 10/12* (2013.01); *Y02E 10/14* (2013.01); *Y02E 10/16* (2013.01); *Y02E 10/36* (2013.01); *Y02E 10/46* (2013.01)

(58) Field of Classification Search
CPC .. F03G 7/04; Y02E 10/10; Y02E 10/46; F24J 3/085; F24J 3/08; F24J 3/086; F24J 3/081; F01K 25/08
USPC .............................. 60/641.1–641.6
See application file for complete search history.

(56) References Cited

U.S. PATENT DOCUMENTS

| | | | | |
|---|---|---|---|---|
| 4,201,060 A | * | 5/1980 | Outmans | 60/641.2 |
| 4,341,077 A | | 7/1982 | Woinsky | |
| 4,996,846 A | * | 3/1991 | Bronicki | 60/641.2 |
| 5,664,419 A | | 9/1997 | Kaplan | |
| 7,775,045 B2 | * | 8/2010 | Kaplan | F01K 23/02 |
| | | | | 60/641.2 |
| 8,438,849 B2 | | 5/2013 | Kaplan et al. | |
| 9,115,603 B2 | | 8/2015 | Leibowitz et al. | |
| 9,127,571 B2 | | 9/2015 | Leibowitz et al. | |
| 2012/0260655 A1 | | 10/2012 | Kaplan et al. | |

(Continued)

*Primary Examiner* — Mark Laurenzi
*Assistant Examiner* — Wesley Harris
(74) *Attorney, Agent, or Firm* — Nath, Goldberg & Meyer; Jerald L. Meyer

(57) ABSTRACT

A method for producing power from two geothermal heat sources includes: separating a first geothermal fluid from a first geothermal heat source into geothermal vapor comprising steam and non-condensable gases, and geothermal brine; supplying the geothermal vapor to a vaporizer; vaporizing a preheated motive fluid using heat from the geothermal vapor, wherein the heat content in the geothermal vapor exiting the flash tank is only enough to vaporize the preheated motive fluid in the vaporizer; expanding the vaporized motive fluid in a vapor turbine producing power and expanded vaporized motive fluid; condensing the expanded vaporized motive fluid to produce condensed motive fluid; and preheating the condensed motive fluid in a preheater using heat from a second geothermal fluid from a second geothermal heat source having a lower temperature and salinity content that the first geothermal fluid, thereby producing the preheated motive fluid, make-up water and heat-depleted geothermal brine.

13 Claims, 4 Drawing Sheets

(56) References Cited

U.S. PATENT DOCUMENTS

2012/0266597 A1    10/2012   Freund et al.
2012/0324885 A1    12/2012   Pierson et al.

* cited by examiner

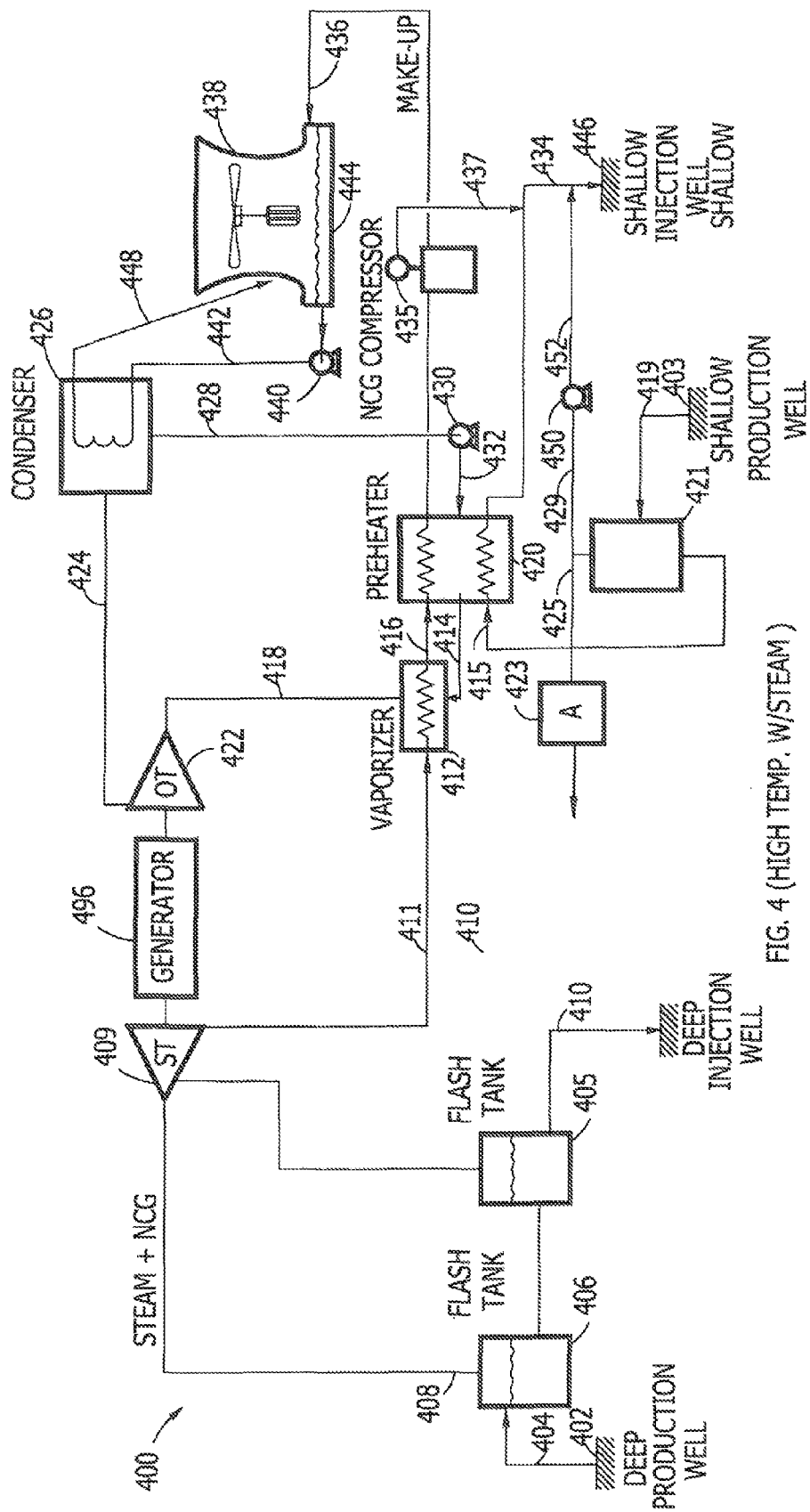
FIG. 4 (HIGH TEMP. W/STEAM)

METHOD AND APPARATUS FOR PRODUCING POWER FROM TWO GEOTHERMAL HEAT SOURCES

TECHNICAL FIELD

The present subject matter relates to a method and apparatus for producing power from geothermal fluid. In particular, the present subject matter relates to using geothermal fluid from two geothermal sources to generate power in a Rankine cycle power plant utilizing a motive fluid.

BACKGROUND

Geothermal power plants utilizing a geothermal fluid source are generally known. The simplest to use and the most economical are the dry steam and steam dominated hydrothermal resources which are similar to conventional power plants. Others use geothermal sources of low to moderate temperature with chemically benign fluid as a heat source. These plants are also relatively simple in design and operation, but operate at low thermal efficiencies due to the temperature range typical of the geothermal sources.

Another source of heat which enables a higher thermal efficiency is a high-temperature hyper-saline brine from a deeper geothermal source having a high concentration of gases and dissolved fluids. Such a source enables a higher thermal efficiency, but is more difficult to handle because of the chemistry of the geothermal fluid. These high-temperature geothermal sources are often vertically superimposed below a lower, more chemically-benign geothermal source, with the deeper, higher-temperature geothermal resource providing heat to the shallower, lower-temperature geothermal source.

Typically, plants designed to utilize the high-temperature, hyper-saline source required double or triple flash high efficiency steam turbines, which produced precipitated solids requiring disposal in hazardous material landfills. Another approach was to use a flash-crystallizer/reactor clarifier (FCRC) system, where clean steam is generated in a train of separators and flash vessels, with the separated brine seeded with material that induces precipitation in the brine rather than on the surfaces of the vessels and piping. The precipitated matter in the brine is eventually allowed to settle in a reactor-clarifier vessel, with the clarified liquid pumped to a secondary clarifier and sent to reinjection wells. Still another solution is to reduce or delay precipitation by adding acid to the brine to lower its pH. While this helps prevent precipitation in the system, adding acid requires the use of corrosion-resistant materials, and may require additional chemical treatment to restore the brine to its original chemistry prior to reinjection.

Therefore, there remains a need to provide a new and improved method of and apparatus for producing power using high-temperature, hyper-saline brine without requiring complex designs or expensive waste treatment.

BRIEF SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present subject matter is directed to a method for producing power from two geothermal heat sources, the method comprising: separating a first geothermal fluid from a first geothermal heat source in a flash tank into geothermal vapor comprising steam and non-condensable gases, and geothermal brine; supplying the geothermal vapor to a vaporizer; vaporizing a preheated motive fluid in the vaporizer using heat from the geothermal vapor to produce heat-depleted geothermal vapor or condensate and vaporized motive fluid, wherein the heat content in the geothermal vapor exiting the flash tank is only enough to vaporize the preheated motive fluid in the vaporizer; expanding the vaporized motive fluid in a vapor turbine producing power and expanded vaporized motive fluid; condensing the expanded vaporized motive fluid in a condenser to produce condensed motive fluid; and preheating the condensed motive fluid in a preheater using heat from said heat-depleted geothermal vapor or condensate and a second geothermal brine from a second geothermal heat source, thereby producing the preheated motive fluid, make-up water and heat-depleted geothermal brine, wherein the second geothermal heat source has a lower temperature and salinity than the first geothermal heat source.

Another aspect of the present subject matter is directed to a method for producing power from two geothermal heat sources, the method comprising: separating a first geothermal fluid from a first geothermal heat source in a flash tank into geothermal vapor comprising steam and non-condensable gases, and geothermal brine; expanding the geothermal vapor in a steam turbine connected to a generator, producing power and expanded geothermal vapor; supplying the expanded geothermal vapor to a vaporizer; vaporizing a preheated motive fluid in the vaporizer using heat from the expanded geothermal vapor to produce heat-depleted geothermal vapor or condensate and vaporized motive fluid, wherein the heat content in the expanded geothermal vapor exiting the steam turbine is only enough to vaporize the preheated motive fluid in the vaporizer; expanding the vaporized motive fluid in a vapor turbine connected to a generator, producing power and expanded vaporized motive fluid; condensing the expanded vaporized motive fluid in a condenser to produce condensed motive fluid; and preheating the condensed motive fluid in a preheater using heat from said heat-depleted geothermal vapor or condensate and a second geothermal brine from a second geothermal heat source, thereby producing the preheated motive fluid, make-up water and heat-depleted geothermal brine, wherein the second geothermal heat source has a lower temperature and salinity than the first geothermal heat source.

A further aspect of the present subject matter is drawn to a method for producing power from two geothermal heat sources, the method comprising: separating a first geothermal fluid from a first geothermal heat source in a first flash tank into geothermal vapor comprising steam and non-condensable gases, and geothermal brine; separating the geothermal brine in a second flash tank into further geothermal vapor comprising steam and non-condensable gases, and further geothermal brine; expanding the geothermal vapor in a steam turbine connected to a generator, producing power and expanded geothermal vapor; expanding the further geothermal vapor in an intermediate stage of the steam turbine, producing power and expanded geothermal vapor; supplying the expanded geothermal vapor to a vaporizer; vaporizing a preheated motive fluid in the vaporizer using heat from the expanded geothermal vapor to produce heat-depleted geothermal vapor or condensate and vaporized motive fluid, wherein the heat content in the expanded geothermal vapor exiting the steam turbine is only enough to vaporize the preheated motive fluid in the vaporizer; expanding the vaporized motive fluid in a vapor turbine connected to a generator, producing power and expanded vaporized motive fluid; condensing the expanded vaporized motive fluid in a condenser to produce condensed motive fluid; and preheating the condensed motive fluid in a preheater using heat from said heat-depleted geothermal vapor or condensate and a second geothermal brine from a second geothermal heat source, thereby producing the preheated motive fluid, make-up water and heat-depleted geothermal brine, wherein the second geothermal heat source has a lower temperature and salinity than the first geothermal heat source.

A still further aspect of the present subject matter is directed to a power plant operating on geothermal fluid from two geothermal heat sources, comprising: a flash tank for separating a first geothermal fluid from a first geothermal heat source into geothermal vapor comprising steam and non-condensable gases, and geothermal brine; a vaporizer for receiving the geothermal vapor and vaporizing a preheated motive fluid using heat from the geothermal vapor to produce heat-depleted geothermal vapor or condensate and vaporized motive fluid, wherein the flash tank is configured to produce geothermal vapor containing a heat content only enough to vaporize the preheated motive fluid in the vaporizer; a vapor turbine for receiving and expanding the vaporized motive fluid, producing power and expanded vaporized motive fluid; a condenser for receiving and condensing the expanded vaporized motive fluid to produce condensed motive fluid; and a preheater receiving the condensed motive fluid, the heat-depleted geothermal vapor or condensate and second geothermal brine from a second geothermal heat source, the preheater heating the condensed motive fluid using heat from said heat-depleted geothermal vapor or condensate and said second geothermal brine, thereby producing the preheated motive fluid, make-up water and heat-depleted geothermal brine, wherein the second geothermal heat source has a lower temperature and salinity than the first geothermal heat source.

A yet further aspect of the present subject matter includes a power plant operating on geothermal fluid from two geothermal heat sources, comprising: a flash tank for separating a first geothermal fluid from a first geothermal heat source into geothermal vapor comprising steam and non-condensable gases, and geothermal brine; a steam turbine connected to a generator for receiving and expanding the geothermal vapor, producing power and expanded geothermal vapor; a vaporizer for receiving the expanded geothermal vapor and vaporizing a preheated motive fluid using heat from the expanded geothermal vapor to produce heat-depleted geothermal vapor and vaporized motive fluid, wherein the flash tank and the steam turbine are configured to produce expanded geothermal vapor containing a heat content only enough to vaporize the preheated motive fluid in the vaporizer; a vapor turbine for receiving and expanding the vaporized motive fluid, producing power and expanded vaporized motive fluid; a condenser for receiving and condensing the expanded vaporized motive fluid to produce condensed motive fluid; and a preheater receiving the condensed motive fluid, the heat-depleted geothermal vapor or condensate and second geothermal brine from a second geothermal heat source, the preheater heating the condensed motive fluid using heat from said heat-depleted geothermal vapor or condensate and said second geothermal brine, thereby producing the preheated motive fluid, make-up water and heat-depleted geothermal brine, wherein the second geothermal heat source has a lower temperature and salinity than the first geothermal heat source.

Another aspect of the present subject matter is drawn to a power plant operating on geothermal fluid from two geothermal heat sources, comprising: a first flash tank for separating a first geothermal fluid from a first geothermal heat source into geothermal vapor comprising steam and non-condensable gases, and geothermal brine; a second flash tank for separating the geothermal brine into further geothermal vapor comprising steam and non-condensable gases, and heat-depleted geothermal brine; a steam turbine comprising multiple stages and connected to a generator for receiving and expanding the geothermal vapor and the further geothermal vapor, producing power and expanded geothermal vapor; a vaporizer for receiving the expanded geothermal vapor and vaporizing a preheated motive fluid using heat from the expanded geothermal vapor to produce heat-depleted geothermal vapor or condensate and vaporized motive fluid, wherein the first and second flash tanks and the steam turbine are configured to produce expanded geothermal vapor containing a heat content only enough to vaporize the preheated motive fluid in the vaporizer; a vapor turbine for receiving and expanding the vaporized motive fluid, producing power and expanded vaporized motive fluid; a condenser for receiving and condensing the expanded vaporized motive fluid to produce condensed motive fluid; and a preheater receiving the condensed motive fluid, the heat-depleted geothermal vapor or condensate and second geothermal brine from a second geothermal heat source, the preheater heating the condensed motive fluid using heat from said heat-depleted geothermal vapor or condensate and said second geothermal brine, thereby producing the preheated motive fluid, make-up water and heat-depleted geothermal brine, wherein the second geothermal heat source has a lower temperature and salinity than the first geothermal heat source.

A yet further aspect of the present subject matter is directed to a method for producing power from geothermal fluid containing non-condensable gases produced from two geothermal heat sources using a two-level power plant, the method comprising: separating a first geothermal fluid from a first geothermal heat source in a first flash tank into geothermal vapor comprising steam and non-condensable gases, and geothermal brine; supplying the geothermal vapor to a first vaporizer in a first-level power plant; vaporizing a preheated motive fluid in the first vaporizer in the first level power plant using heat from the geothermal vapor to produce heat-depleted geothermal vapor or condensate and vaporized motive fluid, wherein the heat content in the geothermal vapor exiting the first flash tank is only enough to vaporize the preheated motive fluid in the first vaporizer in the first level power plant; expanding the vaporized motive fluid in a first vapor turbine in the first level power plant producing power and expanded vaporized motive fluid; condensing the expanded vaporized motive fluid in a first condenser in the first level power plant to produce condensed motive fluid; preheating the condensed motive fluid in a first preheater in the first level power plant using heat from the heat-depleted geothermal vapor or condensate and second geothermal brine from a second geothermal heat source, thereby producing the preheated motive fluid, and make-up water; separating the second geothermal brine in a second flash tank into lower-temperature geothermal vapor comprising lower-temperature steam and non-condensable gases, and heat-depleted geothermal brine; supplying the lower-temperature geothermal vapor to a second vaporizer in a second level power plant; vaporizing a preheated second motive fluid in the second vaporizer in the second level power plant using heat from the lower-temperature geothermal vapor to produce second heat-depleted geothermal vapor or condensate and vaporized second motive fluid, wherein the heat content in the lower-temperature geothermal vapor exiting the second flash tank is only enough to vaporize the preheated second motive fluid in the second vaporizer; expanding the vaporized second motive fluid in a second vapor turbine in the second level power plant producing power and expanded second vaporized motive fluid; condensing the expanded second vaporized motive fluid in a second condenser in the second level power plant to produce condensed second motive fluid; and preheating the condensed second motive fluid in a second preheater using heat from the second heat-depleted geothermal vapor and the heat-depleted geothermal brine, thereby producing the preheated second motive fluid, further make-up water and further heat-depleted geothermal brine, wherein the second geothermal heat source has a lower temperature and salinity than the first geothermal heat source.

BRIEF DESCRIPTION OF THE DRAWINGS

Non-limiting embodiments of the present subject matter are described with respect to the accompanying drawings, wherein:

FIG. 4 is a block diagram showing a power plant using geothermal fluid from a deep production well and geothermal fluid from a shallow production well in accordance with a still further non-limiting embodiment of the present subject matter.

DETAILED DESCRIPTION

Overview

Figure 1:
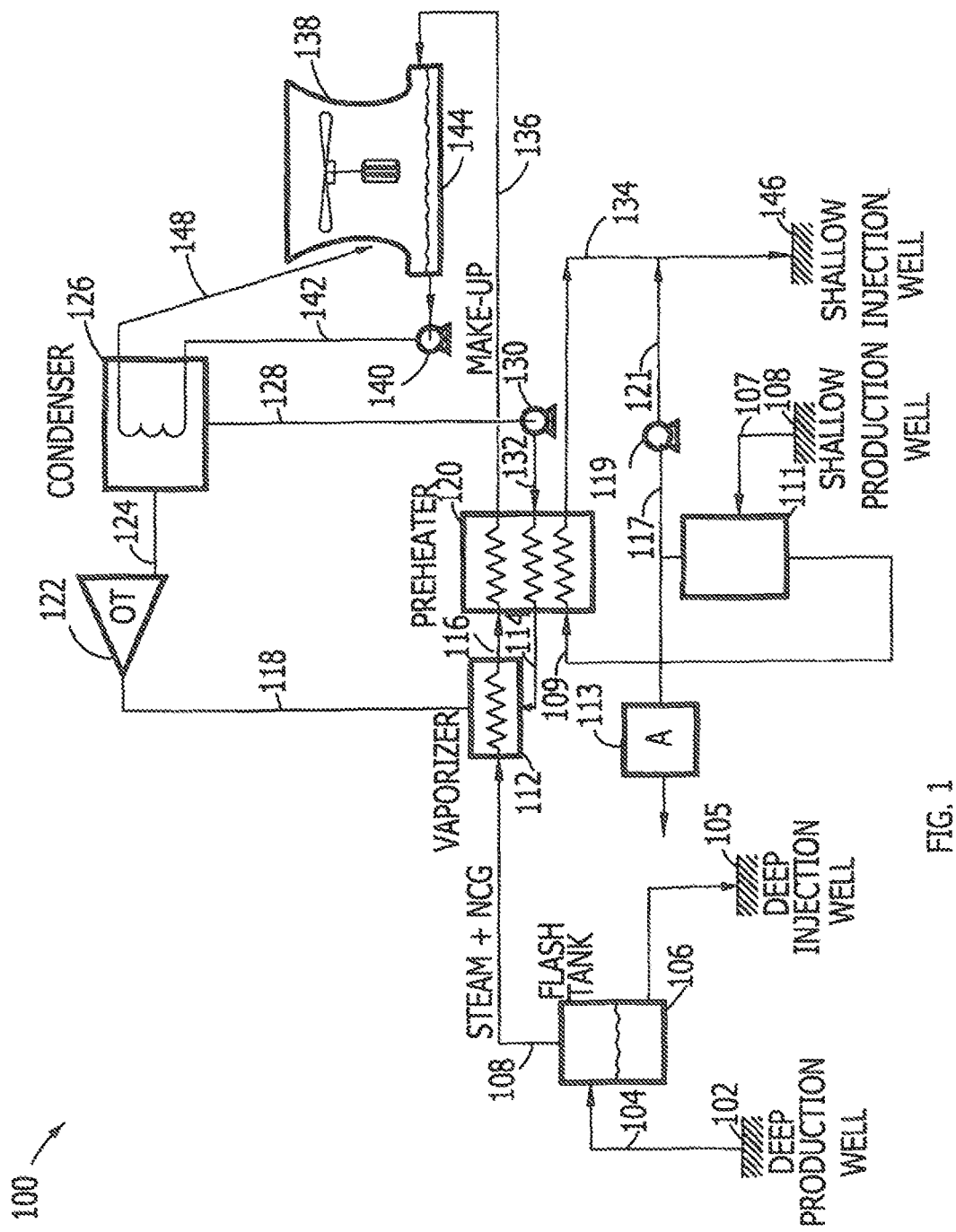
FIG. 1 is a block diagram showing a power plant using geothermal fluid from a deep production well and geothermal fluid from a shallow production well in accordance with a non-limiting embodiment of the present subject matter.

The present subject matter relates to producing power using a first geothermal fluid having high temperature geothermal vapor and hyper-saline brine and a high concentration of gases and dissolved solids and a second geothermal fluid having geothermal vapor and geothermal brine at a lower temperature and salinity than the first geothermal fluid. The present subject matter optimizes latent heat and sensible heat in geothermal fluid, which can be a two-phase fluid, including geothermal fluid containing a geothermal vapor component (comprising geothermal steam and non-condensable gases) and a geothermal liquid or geothermal brine component. Latent heat is often described as the heat released or absorbed by a body or a thermodynamic system during a process that occurs without a change in temperature. In a typical example, the temperature of the body remains constant, but the body undergoes a phase transition, from liquid to gas (boiling) or from liquid to solid (freezing) at a constant temperature. Sensible heat, on the other hand, is often described as heat exchanged by a body or thermodynamic system in which the only effect is a temperature change. A typical example involving sensible heat might include heating water from 10° C. to 20° C.

In an ideal theoretical power plant, the heat present in the geothermal steam component of the two-phase geothermal fluid is transferred from the geothermal steam to a motive fluid or a working fluid, for example an organic fluid, in a vaporizer containing the motive fluid. Except for the presence of non-condensable gases trapped in the geothermal steam, which adversely affect heat transfer, all of the heat transferred to the motive fluid is derived from the latent heat in the geothermal steam. Thus, the temperature of the geothermal steam remains essentially constant.

Prior to reaching its boiling point temperature, sensible heat needs to be added to the motive fluid in order raise its temperature. The sensible heat added to the motive fluid is a considerable percentage of the total heat supplied to the motive fluid in order to reach the boiling point temperature. In prior art systems, the sensible heat needed to reach the boiling point temperature can be supplied by the latent heat in the geothermal steam.

After the boiling point of the motive fluid is reached, the latent heat of vaporization of the motive fluid is supplied by the latent heat of the steam as vaporization of the motive fluid commences.

Turning now to the heat present in the geothermal brine component of the geothermal fluid, all of the heat transferred from the geothermal brine to a motive fluid is sensible heat; and as a consequence, the temperature of the geothermal brine drops as the temperature of the motive fluid increases. In this case, the motive fluid is preheated by the geothermal brine as the latter is cooled in the process. After the temperature of the motive fluid reaches the boiling point, the temperature remains constant. During this phase, if the only heat source is the geothermal brine, the latent heat of vaporization of the motive fluid is supplied by sensible heat in the geothermal brine. Consequently, the maximum temperature available when the heat source is geothermal brine will be less than that available when the source is geothermal steam.

The present subject matter uses both the geothermal steam from a deep production well containing chemically-aggressive geothermal brine within its geothermal fluid and geothermal brine from a shallow production well containing less aggressive geothermal brine in a single system. In other words, the geothermal steam component comes from a higher temperature deep production well and is used under conditions that maximize the amount of heat extracted from the geothermal steam under optimum conditions of thermodynamic efficiency (that is, the latent heat of vaporization of the motive fluid during its boiling phase is supplied by latent heat in the geothermal steam component). Likewise, the geothermal brine component comes from a shallower production well that is operated at a lower temperature, is less chemically aggressive than the geothermal brine in the deep production well, and is used under conditions that maximize the amount of heat extracted from the geothermal brine under optimum efficiency conditions (that is, sensible heat in the working fluid during its pre-heat phase is supplied by sensible heat in the water component) to pre-heat the motive fluid.

Additionally, after the latent heat from in the geothermal steam has been exhausted, the geothermal steam condenses and contains sensible heat as hot water (or make-up water).

The present subject matter further contemplates the use of the sensible heat in the geothermal steam condensate to aid in preheating the motive fluid.

Further aspects of the present subject matter will be discussed in detail with respect to the specific non-limiting embodiments as shown in FIGS. 1-4. One of skill in the art will recognize that the important aspects of the production wells are not necessarily limited to their depths, but rather to the characteristics of the geothermal fluid produced by the production well. Thus, while the present disclosure discusses a "deep" production well as producing geothermal fluid that is high in temperature and chemically aggressive while a "shallow" production well produces geothermal fluid that is lower in temperature and more chemically benign, it is contemplated that a shallow production well may well contain geothermal fluid that is of higher temperature and chemically more aggressive than a deeper production well in that same geographical area. The characteristics of the geothermal sources will depend on the specific areas in which the power plant is to be built.

Non-Limiting Embodiments

Turning now to FIG. 1, a power plant according to the present subject matter is designated by the reference numeral 100. Deep production well 102 produces a first geothermal fluid comprising high temperature geothermal vapor and hyper-saline brine having a high concentration of gases and dissolved solids. Shallow production well 103 produces a second geothermal fluid comprising geothermal vapor and geothermal brine at a lower temperature and salinity than the first geothermal fluid. The first geothermal fluid is supplied via conduit 104 to flash tank 106. In flash tank 106, the first geothermal fluid is separated into geothermal vapor comprising geothermal steam and non-condensable gases, which exits flash tank 106 by way of conduit 108, and geothermal brine, which exits flash tank 106 by way of conduit 110 to deep injection well 105. The geothermal vapor in conduit 108 is supplied to vaporizer 112. Vaporizer 112 also receives liquid motive fluid by way of conduit 114. In vaporizer 112, the latent heat present in the geothermal vapor is utilized to vaporize the motive fluid, producing heat-depleted geothermal vapor (or geothermal vapor condensate) exiting vaporizer 112 by way of conduit 116 and vaporized motive fluid exiting vaporizer 112 by way of conduit 118.

In accordance with the present subject matter, flash tank 106 is configured to produce geothermal vapor containing a latent heat content essentially only enough to vaporize the motive fluid in the vaporizer, which has been previously preheated in preheater 120. In previous geothermal plants, the geothermal vapor exiting a separator contains latent heat. The previous power plant then uses the latent heat in the geothermal vapor to vaporize and, to a certain extent, preheat the motive fluid found in the vaporizer. Thus, in the previous plants, the heat found in the geothermal vapor is not utilized in an optimal capacity. However, in the present subject matter, flash tank 106 is configured to produce geothermal vapor with a specific latent heat content. The specific latent heat content is essentially only sufficient enough to vaporize the preheated motive fluid present in vaporizer 112.

The vaporized motive fluid in conduit 118 is supplied to vapor turbine 122 where the vaporized motive fluid is expanded, producing power and expanded vaporized motive fluid. The expanded vaporized motive fluid is then supplied to condenser 126 by way of conduit 124. In condenser 126, the expanded vaporized motive fluid is condensed to form condensed motive fluid in conduit 128. The condensed motive fluid in line 128 is pumped by pump 130 to preheater 120 by way of conduit 132.

In preheater 120, the condensed motive fluid is preheated using sensible heat from the heat-depleted geothermal vapor or condensate, which is supplied to preheater 120 by conduit 116, and/or from the second geothermal fluid via conduit 109. The second geothermal fluid is supplied from shallow production well 103 via conduit 107 to separator 111. In separator 111 non-condensable gases are removed from the second geothermal fluid. Non-condensable gases can then be passed through an abatement system 113 via conduit 115, or they can be passed via conduit 117 to compressor 119 and added to heat-depleted geothermal brine via conduit 121 to be supplied to shallow injection well 146 by conduit 134. The sensible heat from the heat-depleted geothermal vapor and/or the second geothermal fluid heats the condensed motive fluid to its boiling point temperature, thereby producing the preheated motive fluid that is supplied to vaporizer 112 through conduit 114. As the sensible heat is removed from the heat-depleted geothermal vapor or condensate, make-up water is produced. The make-up water is optionally supplied to cooling pond 144 by way of conduit 136. The second geothermal fluid loses sensible heat in preheater 120 and forms heat-depleted geothermal brine. The heat-depleted geothermal brine is supplied to shallow injection well 146 by conduit 134.

Cooling pond 144 is used in conjunction with cooling tower 138. Cooling pond 144 supplies cooling water to condenser 126. Pump 140 pumps the cooling water to condenser 126 through conduit 142. The cooling water exiting condenser 126 returns to cooling pond 144 by way of conduit 148.

In the non-limiting embodiment of FIG. 1, it is contemplated that the motive fluid is any working fluid capable of being vaporized in vaporizer 112 and being expanded in vapor turbine 122. In a particular aspect, the motive fluid is an organic working fluid and vapor turbine 122 is an organic vapor turbine. Organic working fluids suitable for use in the present subject matter include, without limitation, pentane and isopentane, butane and iso-butane, etc. However, other organic working fluids may also work in the power plant of the present subject matter.

As indicated above, the size and configuration of flash tank 106 will depend on the amount of latent heat that needs to be present in the geothermal vapor. An aspect of the present subject matter is that the amount of latent heat in the geothermal vapor is essentially only enough to vaporize the preheated motive fluid in the vaporizer. A flash tank sized and configured to supply just enough latent heat in the geothermal vapor to vaporize one particular motive fluid may not be a properly sized and configured flash tank to supply just enough latent heat in the geothermal vapor to vaporize a different motive fluid. In other words, a flash tank sized and configured to supply geothermal vapor with just enough latent heat to vaporize n-pentane in a non-limiting example will not be able to supply geothermal vapor with just enough latent heat to vaporize isopentane.

Figure 2:
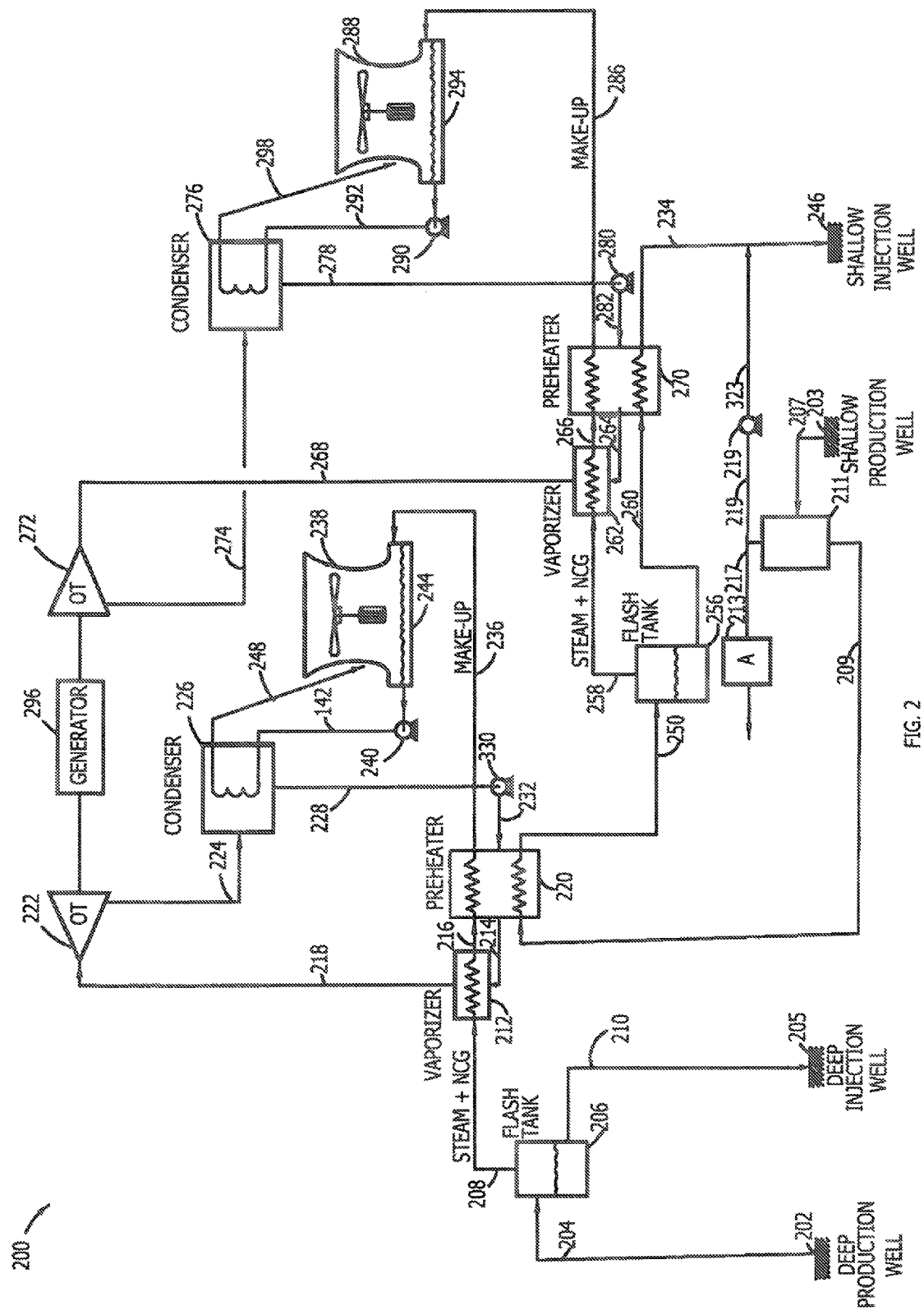
FIG. 2 is a block diagram showing a power plant using geothermal fluid from a deep production well and geothermal fluid from a shallow production well in accordance with another non-limiting embodiment of the present subject matter.

Turning now to FIG. 2, another power plant according to the present subject matter is designated by the reference numeral 200. Deep production well 202 produces a first geothermal fluid comprising high temperature geothermal vapor and hyper-saline brine having a high concentration of gases and dissolved solids. Shallow production well 203 produces a second geothermal fluid comprising geothermal vapor and geothermal brine at a lower temperature and salinity than the first geothermal fluid. The first geothermal fluid is supplied via conduit 204 to flash tank 206. In flash tank 206, the first geothermal fluid is separated into geothermal vapor comprising geothermal steam and non-condensable gases, which exits flash tank 206 by way of conduit 208, and geothermal brine, which exits flash tank 206 by way of conduit 210 to deep injection well 205. The geothermal vapor in conduit 208 is supplied to first vaporizer 212. First vaporizer 212 also receives liquid motive fluid by way of conduit 214. In first vaporizer 212, the latent heat present in the geothermal vapor is utilized to vaporize the motive fluid, producing heat-depleted geothermal vapor (or geothermal vapor condensate) exiting first vaporizer 212 by way of conduit 216 and vaporized motive fluid exiting vaporizer 212 by way of conduit 218.

In accordance with the present subject matter, first flash tank 206 is configured to produce geothermal vapor containing a latent heat content essentially only enough to vaporize the motive fluid in the vaporizer, which has been previously preheated in preheater 220. In previous geothermal plants, the geothermal vapor exiting a separator contains latent heat. The previous power plant then uses the latent heat in the geothermal vapor to vaporize and, to a certain extent, preheat the motive fluid found in the vaporizer. Thus, in the previous plants, the heat found in the geothermal vapor is not utilized in an optimal capacity. However, in the present subject matter, first flash tank 206 is configured to produce geothermal vapor with a specific latent heat content. The specific latent heat content is essentially only sufficient enough to vaporize the preheated motive fluid present in vaporizer 212.

The vaporized motive fluid in conduit 218 is supplied to vapor turbine 222 where the vaporized motive fluid is expanded, producing power and expanded vaporized motive fluid. The expanded vaporized motive fluid is then supplied to condenser 226 by way of conduit 224. In condenser 226, the expanded vaporized motive fluid is condensed to form condensed motive fluid in conduit 228. The condensed motive fluid in line 228 is pumped by pump 230 to preheater 220 by way of conduit 232.

In preheater 220, the condensed motive fluid is preheated using sensible heat from the heat-depleted geothermal vapor or condensate, which is supplied to preheater 220 by conduit 216, and/or from the second geothermal fluid via conduit 209. The second geothermal fluid is supplied from shallow production well 203 via conduit 207 to separator 211. In separator 211 non-condensable gases are removed from the second geothermal fluid. Non-condensable gases can then be passed through abatement system 213 via conduit 215, or they can be passed via conduit 217 to compressor 219 and added to heat-depleted geothermal brine via conduit 221 to be supplied to shallow injection well 246 by conduit 234. The sensible heat from the heat-depleted geothermal vapor or condensate and/or the second geothermal fluid heats the condensed motive fluid to its boiling point temperature, thereby producing the preheated motive fluid that is supplied to vaporizer 212 through conduit 214. As the sensible heat is removed from the heat-depleted geothermal vapor or condensate, make-up water is produced. The make-up water is optionally supplied to cooling pond 244 by way of conduit 236. The geothermal brine loses sensible heat in preheater 220 and forms heat-depleted geothermal brine.

Cooling pond 244 is used in conjunction with cooling tower 238. Cooling pond 244 supplies cooling water to condenser 226. Pump 240 pumps the cooling water to condenser 226 through conduit 242. The cooling water exiting condenser 226 returns to cooling pond 244 by way of conduit 248.

The heat-depleted geothermal brine from second production well 203 exits preheater 220 by way of conduit 250 and is supplied to second flash tank 256. In second flash tank 256, the heat-depleted geothermal brine is separated into a lower-temperature geothermal vapor comprising lower-temperature geothermal steam and non-condensable gases, which exits second flash tank 256 by way of conduit 258, and further heat-depleted geothermal brine, which exits second flash tank 256 by way of conduit 260. The lower temperature geothermal vapor in conduit 258 is supplied to second vaporizer 262. Second vaporizer 262 also receives a second liquid motive fluid by way of conduit 264. In second vaporizer 262, the latent heat present in the lower temperature geothermal vapor is utilized to vaporize the second motive fluid, producing second heat-depleted geothermal vapor (or second geothermal vapor condensate) exiting second vaporizer 262 by way of conduit 266 and vaporized motive fluid exiting vaporizer 212 by way of conduit 268.

In accordance with the present subject matter, second flash tank 256 is configured to produce lower temperature geothermal vapor containing a latent heat content essentially only enough to vaporize the second motive fluid in the second vaporizer, which has been previously preheated in preheater 270. In other words, in the present subject matter, second flash tank 256 is configured to produce lower temperature (and lower pressure) geothermal vapor with a specific latent heat content. The specific latent heat content is essentially only sufficient enough to vaporize the preheated second motive fluid present in vaporizer 262.

The vaporized second motive fluid in conduit 268 is supplied to second vapor turbine 272 where the vaporized second motive fluid is expanded, producing power and expanded second vaporized motive fluid. In the present non-limiting embodiment, vapor turbine 222 is connected to a generator in order to produce power, and second vapor turbine 272 is also connected to a generator to produce power. In an optional aspect of the present subject matter, an output shaft of vapor turbine 222 and an output shaft of second vapor turbine 272 are each connected to generator 296. However, it is also contemplated within the scope of the present subject matter that vapor turbine 222 and second vapor turbine 272 will each have a separate generator used to generate power and will not be connected to the same generator 296.

The expanded vaporized motive fluid is then supplied to second condenser 276 by way of conduit 274. In second condenser 276, the expanded second vaporized motive fluid is condensed to form condensed second motive fluid in conduit 278. The condensed second motive fluid in conduit 278 is pumped by pump 280 to preheater 270 by way of conduit 282.

In second preheater 270, the condensed second motive fluid is preheated using sensible heat from the second heat-depleted geothermal vapor or condensate, which is supplied to second preheater 270 by conduit 266, and from the further heat-depleted geothermal brine, which is supplied to second preheater 270 by conduit 260. The sensible heat from the second heat-depleted geothermal vapor or condensate and the further heat-depleted geothermal brine heats the condensed second motive fluid to its boiling point temperature, thereby producing the preheated second motive fluid that is supplied to vaporizer 262 through conduit 264. As the sensible heat is removed from the second heat-depleted geothermal vapor or condensate, further make-up water is produced. The further make-up water is optionally supplied to second cooling pond 294 by way of conduit 286.

The further heat-depleted geothermal brine loses sensible heat in second preheater 270 and forms still further heat-depleted geothermal brine.

Thus, the present embodiment can be considered as a two-level power plant unit having first vapor turbine 222 operating on high temperature geothermal fluid (high temperature geothermal vapor and non-condensable gases) and second vapor turbine 272 operating on lower temperature geothermal fluid (lower temperature geothermal vapor and non-condensable gases and lower temperature geothermal brine). Furthermore, if vapor turbine 222 and vapor turbine 272 run a common electric generator, for example electric generator 296, the power plant can be considered as an integrated two-level power plant unit.

In an alternative configuration, the heat depleted brine exiting separator 211 can be supplied directly in series to flash tank 256 rather than supplying it first to the first preheater. Thereafter, the further heat depleted brine exiting second flash tank 256 can be supplied to both first and second preheaters in parallel in accordance with U.S. Pat. Nos. 4,578,953, 4,700,543, and 5,531,073, as well as U.S. patent application Ser. No. 13/190,148, the disclosures of which are hereby incorporated by reference.

Second cooling pond 294 is used in conjunction with second cooling tower 288. Second cooling pond 294 supplies cooling water to second condenser 276. Pump 290 pumps the cooling water to second condenser 276 through conduit 292. The cooling water exiting second condenser 276 returns to second cooling pond 294 by way of conduit 298.

While the non-limiting embodiment of FIG. 2 shows two cooling ponds and two cooling towers for receiving the make-up water and further make-up water, respectively, and for supplying cooling water to condenser 226 and second condenser 276, respectively, it is also contemplated that only one cooling pond and cooling tower can be used. In such an embodiment, the single cooling pond supplies cooling water to both condensers and receives all of the make-up water.

Further, in the non-limiting embodiment of FIG. 2, it is contemplated that the motive fluid is any working fluid capable of being vaporized in vaporizer 212 and second vaporizer 262, and being expanded in vapor turbine 222 and second vapor turbine 272. In a particular aspect, the motive fluid is an organic working fluid and the vapor turbines 222, 272 are organic vapor turbines. Organic working fluids suitable for use in the present subject matter include, without limitation, pentane and isopentane, butane and iso-butane, etc. However, other organic working fluids may also work in the power plant of the present subject matter.

As indicated above, the size and configuration of each flash tank 206, 256 will depend on the amount of latent heat that needs to be present in the respective geothermal vapor. An aspect of the present subject matter is that the amount of latent heat in the respective geothermal vapor is essentially only enough to vaporize the respective preheated motive fluid in the particular vaporizer. A flash tank sized and configured to supply essentially just enough latent heat in the geothermal vapor to vaporize one particular motive fluid may not be a properly sized and configured flash tank to supply just enough latent heat in the geothermal vapor to vaporize a different motive fluid. In other words, a flash tank sized and configured to supply geothermal vapor with essentially just enough latent heat to vaporize n-pentane in a non-limiting example will not be able to supply geothermal vapor with just enough latent heat to vaporize isopentane.

Figure 3:
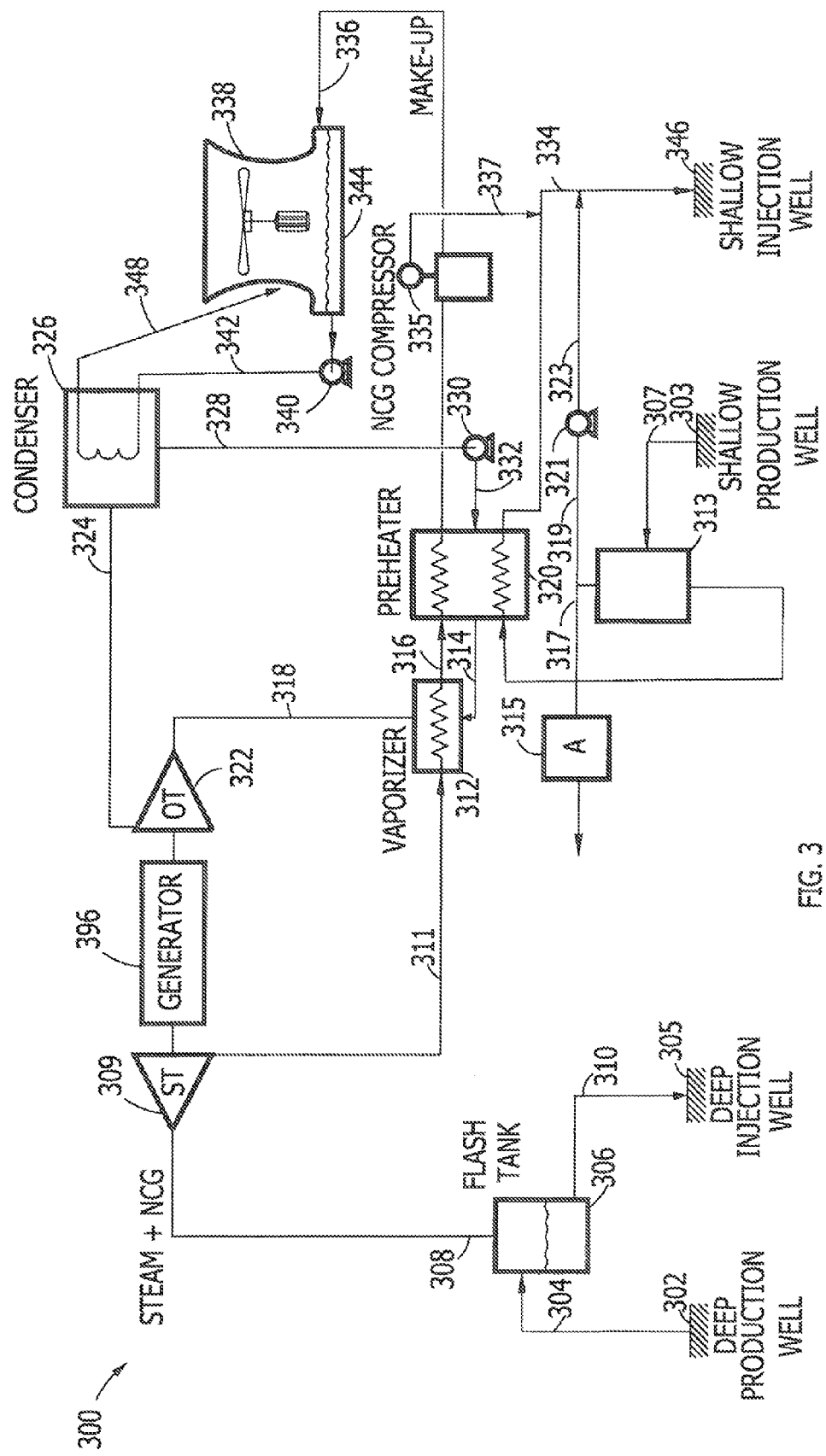
FIG. 3. is a block diagram showing a power plant using geothermal fluid from a deep production well and geothermal fluid from a shallow production well in accordance with a further non-limiting embodiment of the present subject matter.

A further power plant according to the present subject matter is designated by the reference numeral 300 in FIG. 3. Deep production well 302 produces a first geothermal fluid comprising high temperature geothermal vapor and hypersaline brine having a high concentration of gases and dissolved solids. Shallow production well 303 produces a second geothermal fluid comprising geothermal vapor and geothermal brine at a lower temperature and salinity than the first geothermal fluid. In this embodiment, the second geothermal fluid produced by shallow production well 303 has a higher temperature and a greater amount of latent heat than the second geothermal fluid produced in the shallow production wells discussed above with respect to FIGS. 1 and 2, but still at a lower temperature and salinity than the geothermal fluid produced by deep production well 302. The first geothermal fluid is supplied via conduit 304 to flash tank 306. In flash tank 306, the first geothermal fluid is separated into geothermal vapor comprising geothermal steam and non-condensable gases, which exits flash tank 306 by way of conduit 308, and geothermal brine, which exits flash tank 306 by way of conduit 310 to deep injection well 305. The geothermal vapor in conduit 308 is supplied to steam turbine 309 connected to generator 396, where the geothermal vapor is expanded, producing power and expanded geothermal vapor. Expanded geothermal vapor is supplied to vaporizer 312 by way of conduit 311. Vaporizer 312 also receives liquid motive fluid by way of conduit 314. In vaporizer 312, the latent heat present in the expanded geothermal vapor is utilized to vaporize the motive fluid, producing heat-depleted geothermal vapor (or geothermal vapor condensate) exiting vaporizer 312 by way of conduit 316 and vaporized motive fluid exiting vaporizer 312 by way of conduit 318.

In accordance with the present subject matter, flash tank 306 is configured to produce geothermal vapor containing a large amount of latent. Steam turbine 309 is configured to expand the geothermal vapor to produce expanded geothermal vapor containing a latent heat content essentially only enough to vaporize the motive fluid in the vaporizer, which has been previously preheated in preheater 320. In other words, steam turbine 309 removes pressure from the geothermal vapor exiting flash tank 306 and steam turbine 309 is configured to remove just enough sensible heat and pressure from the geothermal vapor that the remaining latent heat present in the expanded geothermal vapor is essentially just enough to vaporize the preheated liquid motive fluid present in vaporizer 312. In the present embodiment, flash tank 306 and steam turbine 309 work in conjunction and are configured to produce expanded geothermal vapor with a specific latent heat content. The specific latent heat content is essentially only sufficient enough to vaporize the preheated motive fluid present in vaporizer 312.

The vaporized motive fluid in conduit 318 is supplied to vapor turbine 322 connected to generator 396, where the vaporized motive fluid is expanded, thereby producing power and expanded vaporized motive fluid. The expanded vaporized motive fluid is then supplied to condenser 326 by way of conduit 324. In condenser 326, the expanded vaporized motive fluid is condensed to form condensed motive fluid in conduit 328. The condensed motive fluid in conduit 328 is pumped by pump 330 to preheater 320 by way of conduit 332.

In preheater 320, the condensed motive fluid is preheated using sensible heat from the heat-depleted geothermal vapor or condensate, which is supplied to preheater 320 by conduit 316, and/or from the second geothermal fluid via conduit 309. The second geothermal fluid is supplied from shallow production well 303 via conduit 307 to separator 313. In separator 313 non-condensable gases are removed from the second geothermal fluid. Non-condensable gases are either passed through an abatement system 315 via conduit 317, or are passed via conduit 319 to compressor 321 and added to heat-depleted geothermal brine via conduit 323 to be supplied to shallow injection well 346 by conduit 334. The sensible heat from the heat-depleted geothermal vapor or condensate and/or the second geothermal fluid heats the condensed motive fluid to its boiling point temperature, thereby producing the preheated motive fluid that is supplied to vaporizer 312 through conduit 314.

As the sensible heat is removed from the heat-depleted geothermal vapor, further heat-depleted geothermal vapor or condensate is produced. Compressor 335 compresses the non-condensable gases present in the further heat-depleted geothermal vapor or condensate exiting preheater 320. The compressed non-condensable gases are fed to conduit 334 by way of conduit 337, where they are mixed with the heat-depleted geothermal brine exiting preheater 320. The make-up water present after the non-condensable gases are compressed and removed is optionally supplied to cooling pond 344 by way of conduit 336. The geothermal brine loses sensible heat in preheater 320 and forms heat-depleted geothermal brine. The heat-depleted brine and compressed non-condensable gases are supplied to shallow injection well 346 by conduit 334.

Cooling pond 344 is used in conjunction with cooling tower 338. Cooling pond 344 supplies cooling water to condenser 326. Pump 340 pumps the cooling water to condenser 326 through conduit 342. The cooling water exiting condenser 326 returns to cooling pond 344 by way of conduit 348.

In the non-limiting embodiment of FIG. 3, it is contemplated that the motive fluid is any working fluid capable of being vaporized in vaporizer 312 and being expanded in vapor turbine 322. In a particular aspect, the motive fluid is an organic working fluid and vapor turbine 322 is an organic vapor turbine. Organic working fluids suitable for use in the present subject matter include, without limitation, pentane and isopentane, butane and iso-butane, etc. However, other organic working fluids may also work in the power plant of the present subject matter.

As indicated above, the size and configuration of flash tank 306 and steam turbine 309 will depend on the amount of latent heat that needs to be present in the expanded geothermal vapor. An aspect of the present subject matter is that the amount of latent heat in the expanded geothermal vapor is essentially only enough to vaporize the preheated motive fluid in the vaporizer. A flash tank and steam turbine sized and configured to remove essentially just enough sensible heat and supply essentially just enough latent heat in the expanded geothermal vapor to vaporize one particular motive fluid may not be a properly sized and configured flash tank to supply just enough latent heat in the expanded geothermal vapor to vaporize a different motive fluid.

In the non-limiting embodiment depicted in FIG. 3, vapor turbine 322 is connected to a generator in order to produce power, and steam turbine 309 is also connected to a generator to produce power. In an optional aspect of this embodiment, an output shaft of vapor turbine 322 and an output shaft of steam turbine 309 are each connected to generator 396. However, it is also contemplated within the scope of the present subject matter that vapor turbine 322 and steam turbine 309 will each have a separate generator used to generate power and will not be connected to the same generator 396.

Another power plant according to the present subject matter is designated by the reference numeral 400 in FIG. 4. Deep production well 402 produces a first geothermal fluid comprising high temperature geothermal vapor and hypersaline brine having a high concentration of gases and dissolved solids. Shallow production well 403 produces a second geothermal fluid comprising geothermal vapor and geothermal brine at a lower temperature and salinity than the first geothermal fluid. In this embodiment, the second geothermal fluid produced by shallow production well 403 has a higher temperature and a greater amount of latent heat than the second geothermal fluid produced in the shallow production wells discussed above with respect to FIGS. 1-3, but still at a lower temperature and salinity than the geothermal fluid produced by deep production well 402. The first geothermal fluid is supplied via conduit 404 to first flash tank 406. In first flash tank 406, the hot geothermal fluid is separated into a geothermal vapor comprising geothermal steam and non-condensable gases, which exits first flash tank 406 by way of conduit 408, and geothermal brine, which exits flash tank 406 by way of conduit 407. The geothermal vapor in conduit 408 is supplied to steam turbine 409 connected to generator 496, where the geothermal vapor is expanded, producing power and expanded geothermal vapor. Steam turbine 409 comprises multiple stages for expanding geothermal steam at various pressures and temperatures.

The geothermal brine in conduit 407 is supplied to second flash tank 405, where the geothermal brine is separated into lower-temperature geothermal vapor exiting second flash tank 405 by way of conduit 403 and further geothermal brine exiting second flash tank 405 by way of conduit 410 to deep injection well 401. The lower-temperature geothermal vapor comprises lower-temperature geothermal steam and non-condensable gases at temperatures and pressures lower than the geothermal vapor exiting first flash tank 406 in conduit 408. The lower-temperature geothermal vapor in conduit 403 is supplied to an intermediate stage of multi-stage steam turbine 409, where the lower-temperature geothermal vapor is expanded, producing power and expanded geothermal vapor.

Expanded geothermal vapor is supplied to vaporizer 412 by way of conduit 411. Vaporizer 412 also receives liquid motive fluid by way of conduit 414. In vaporizer 412, the latent heat present in the expanded geothermal vapor is utilized to vaporize the motive fluid, producing heat-depleted geothermal vapor (or geothermal vapor condensate) exiting vaporizer 412 by way of conduit 416 and vaporized motive fluid exiting vaporizer 412 by way of conduit 418.

In accordance with the present subject matter, first flash tank 406 is configured to produce at a certain pressure geothermal vapor containing a large amount of latent and sensible heat. In addition, second flash tank 405 is configured to produce lower-temperature geothermal vapor containing a lesser amount of latent than is present in the geothermal vapor exiting first flash tank 406. Steam turbine 409 is a multi-stage turbine and is configured to expand the respective geothermal vapors to produce expanded geothermal vapor containing a latent heat content essentially only enough to vaporize the motive fluid in the vaporizer, which has been previously preheated in preheater 420. In other words, steam turbine 409 reduces pressure from the respective geothermal vapors exiting first flash tank 406 and second flash tank 405 and steam turbine 409 is configured to remove essentially just enough sensible heat and pressure from the geothermal vapors that the remaining latent heat present in the expanded geothermal vapor is essentially just enough to vaporize the preheated liquid motive fluid present in vaporizer 412. In the present embodiment, first flash tank 406, second flash tank 405 and steam turbine 409 work in conjunction and are configured to produce expanded geothermal vapor with a specific latent heat content. The specific latent heat content is essentially only sufficient enough to vaporize the preheated motive fluid present in vaporizer 412.

The vaporized motive fluid in conduit 418 is supplied to vapor turbine 422 connected to generator 496, where the vaporized motive fluid is expanded, thereby producing power and expanded vaporized motive fluid. The expanded vaporized motive fluid is then supplied to condenser 426 by way of conduit 424. In condenser 426, the expanded vaporized motive fluid is condensed to form condensed motive fluid in conduit 428. The condensed motive fluid in conduit 428 is pumped by pump 430 to preheater 420 by way of conduit 432.

In preheater 420, the condensed motive fluid is preheated using sensible heat from the heat-depleted geothermal vapor or condensate, which is supplied to preheater 420 by conduit 416, and/or from the second geothermal fluid via conduit 415. The second geothermal fluid is supplied from shallow production well 403 via conduit 409 to separator 421. In separator 421 non-condensable gases are removed from the second geothermal fluid. Non-condensable gases can then be passed through an abatement system 423 via conduit 425, or they can be passed via conduit 429 to compressor 450 and added to heat-depleted geothermal brine via conduit 452 to be supplied to shallow injection well 446 by conduit 434. The sensible heat from the heat-depleted geothermal vapor or condensate and/or the second geothermal fluid heats the condensed motive fluid to its boiling point temperature, thereby producing the preheated motive fluid that is supplied to vaporizer 412 through conduit 414.

As the sensible heat is removed from the heat-depleted geothermal vapor, further heat-depleted geothermal vapor is produced. Compressor 435 compresses the non-condensable gases present in the further heat-depleted geothermal vapor exiting preheater 420. The compressed non-condensable gases are fed to conduit 434 by way of conduit 437, where they are mixed with the heat-depleted geothermal brine exiting preheater 420. The make-up water present after the non-condensable gases are compressed and removed is optionally supplied to cooling pond 444 by way of conduit 436. The geothermal brine loses sensible heat in preheater 420 and forms heat-depleted geothermal brine. The heat-depleted brine and compressed non-condensable gases are supplied to shallow injection well 446 by conduit 434.

Cooling pond 444 is used in conjunction with cooling tower 438. Cooling pond 444 supplies cooling water to condenser 426. Pump 440 pumps the cooling water to condenser 426 through conduit 442. The cooling water exiting condenser 426 returns to cooling pond 444 by way of conduit 448.

In the non-limiting embodiment of FIG. 4, it is contemplated that the motive fluid is any working fluid capable of being vaporized in vaporizer 412 and being expanded in vapor turbine 422. In a particular aspect, the motive fluid is an organic working fluid and vapor turbine 422 is an organic vapor turbine. Organic working fluids suitable for use in the present subject matter include, without limitation, pentane and isopentane, butane and iso-butane, etc. However, other organic working fluids may also work in the power plant of the present subject matter.

As indicated above, the size and configuration of first flash tank 406, second flash tank 405 and steam turbine 409 will depend on the amount of latent heat that needs to be present in the expanded geothermal vapor. An aspect of the present subject matter is that the amount of latent heat in the expanded geothermal vapor is essentially only enough to vaporize the preheated motive fluid in the vaporizer. Flash tanks and steam turbine sized and configured to remove just enough sensible heat and supply just enough latent heat in the expanded geothermal vapor to vaporize one particular motive fluid may not be a properly sized and configured flash tank to supply just enough latent heat in the expanded geothermal vapor to vaporize a different motive fluid.

In the non-limiting embodiment depicted in FIG. 4, vapor turbine 422 is connected to a generator in order to produce power, and steam turbine 409 is also connected to a generator to produce power. In an optional aspect of this embodiment, an output shaft of vapor turbine 422 and an output shaft of steam turbine 409 are each connected to generator 496. However, it is also contemplated within the scope of the present subject matter that vapor turbine 422 and steam turbine 409 will each have a separate generator used to generate power and will not be connected to the same generator 496.

Operating Parameters

Examples of temperatures and pressures applicable to the embodiments described above are as follows:

Steam exits separator 106 at about 180° C. and a pressure of about 9.5 bara while the separated geothermal brine exits separator 111 at about 180° C. and a pressure of about 10 bara in the embodiment described with reference to FIG. 1.

Steam exits first separator 206 at about 170° C. and a pressure of about 7.75 bara while the separated geothermal brine exits first separator 211 at about 170° C. and a pressure of about 8 bara in the embodiment described with reference to FIG. 2. On the other hand, steam exits second separator 256 at about 115° C. and a pressure of about 1.7 bara while the separated geothermal brine exits second separator 256 at about 115° C. and a pressure of about 1.7 bara in the embodiment described with reference to FIG. 2.

Turning now to FIG. 3, steam exits separator 306 at about 205° C. and a pressure of about 18 bara and is supplied to the steam turbine. On the other hand, the separated geothermal brine exits separator 313 at about 180° C. and a pressure of about 10 bara in the embodiment described with reference to FIG. 3.

Turning now to FIG. 4, steam exits first separator 406 at about 221° C. and a pressure of about 23.5 and is supplied to the steam turbine. On the other hand, steam exits second separator 405 at about 125° C. and a pressure of about 2.3 bara while the separated geothermal brine exits separator 419 at about 115° C. and a pressure of about 1.7 bara in the embodiment described with reference to FIG. 4.

It is to be pointed out that a recuperator can be used in the motive fluid cycle described in the embodiments of the present subject matter.

Furthermore, referring to the embodiments described with reference to FIGS. 3 and 4, advantageously a relatively small portion of the hot brine supplied to flash tanks 306 and 406 can be used to superheat the steam exiting these flash tanks.

While the present subject matter describes embodiments where the heat depleted geothermal vapor condensate can be used as make-up water for a cooling tower, the heat-depleted geothermal vapor condensate could be used as make-up water for an air-cooled condenser wherein water is evaporated to evaporatively cool the air supplied to the air-cooled condenser. Furthermore, the present subject matter, if advantageous, could be used with an air-cooled condenser without evaporative cooling. In such a case, the heat depleted geothermal vapor condensate could be added to the geothermal brine prior to supplying it to the preheater.

Therefore, it will be understood that many additional changes in the details, materials, steps and arrangement of parts, which have been herein described and illustrated to explain the nature of the disclosure, may be made by those skilled in the art within the principal and scope of the disclosure as expressed in the appended claims.

What is claimed is:

1. A method for producing power from two geothermal heat sources, the method comprising:
   separating a first geothermal fluid from a first geothermal heat source in a flash tank into geothermal vapor comprising steam and non-condensable gases, and geothermal brine;
   supplying the geothermal vapor to a vaporizer;
   vaporizing a preheated first motive fluid in the vaporizer using heat from the geothermal vapor, wherein the heat content in the geothermal vapor exiting the flash tank is only enough to vaporize the preheated first motive fluid in the vaporizer;
   expanding the vaporized first motive fluid in a vapor turbine producing power and expanded vaporized first motive fluid;
   condensing the expanded first vaporized motive fluid in a condenser to produce condensed first motive fluid;
   preheating the condensed first motive fluid in a preheater using heat from heat depleted geothermal vapor or condensate and a second geothermal fluid from a second geothermal heat source having a lower temperature and salinity content than the first geothermal fluid, thereby producing the preheated first motive fluid, make-up water and heat-depleted geothermal brine;
   separating the heat-depleted geothermal brine in a second flash tank into lower-temperature geothermal vapor comprising lower-temperature steam and non-condensable gases, and further heat-depleted geothermal brine;
   supplying the lower-temperature geothermal vapor to a second vaporizer;
   vaporizing a preheated second motive fluid in the second vaporizer using heat from the lower-temperature geothermal vapor to produce heat-depleted geothermal vapor and vaporized second motive fluid, wherein the heat content in the lower-temperature geothermal vapor exiting the second flash tank is only enough to vaporize the preheated second motive fluid in the second vaporizer;
   expanding the vaporized second motive fluid in a second vapor turbine producing power and expanded second vaporized motive fluid;
   condensing the expanded second vaporized motive fluid in a second condenser to produce condensed second motive fluid; and
   preheating the condensed second motive fluid in a second preheater using heat from the second heat-depleted geothermal vapor and the further heat-depleted geothermal brine, thereby producing the preheated second motive fluid, further make-up water and still further heat-depleted geothermal brine.

2. The method of claim 1, further comprising supplying the make-up water to a cooling pond.

3. The method of claim 1, further comprising supplying cooling water from a cooling pond to the condenser.

4. The method of claim 1, wherein the first motive fluid comprises an organic fluid.

5. The method of claim 1, wherein the first motive fluid and the second motive fluid comprise different motive fluids.

6. The method of claim 1, wherein the first motive fluid and the second motive fluid comprise the same fluid.

7. The method of claim 1, further comprising supplying the make-up water to a first cooling pond and the further make-up water to a second cooling pond.

8. The method of claim 1, further comprising supplying the make-up water and the further make-up water to a cooling pond.

9. The method of claim 1, further comprising:
   supplying cooling water from a first cooling pond to the condenser; and
   supplying further cooling water from a second cooling pond to the second condenser.

10. The method of claim 1, further comprising providing a single generator connected to output shafts from the vapor turbine and the second vapor turbine to produce power.

11. The method of claim 1, wherein the first motive fluid and the second motive fluid comprise an organic fluid.

12. A power plant operating on geothermal fluid from two geothermal heat sources, comprising:
   a flash tank for separating a first geothermal fluid from a first geothermal heat source into geothermal vapor comprising steam and non-condensable gases, and geothermal brine;
   a vaporizer for receiving the geothermal vapor and vaporizing a preheated motive fluid using heat from the geothermal vapor to produce heat-depleted geothermal vapor and vaporized motive fluid, wherein the flash tank is configured to produce geothermal vapor containing a heat content only enough to vaporize the preheated motive fluid in the vaporizer;
   a vapor turbine for receiving and expanding the vaporized motive fluid, producing power and expanded vaporized motive fluid;
   a condenser for receiving and condensing the expanded vaporized motive fluid to produce condensed motive fluid;
   a preheater receiving the condensed motive fluid, the heat-depleted geothermal vapor or condensate and a second geothermal fluid from a second geothermal heat source having a lower temperature and salinity content than the first geothermal fluid, the preheater heating the condensed motive fluid using heat from said heat-depleted geothermal vapor or condensate and said second geothermal fluid, thereby producing the preheated motive fluid, make-up water and heat-depleted geothermal brine;
   a second flash tank for separating the heat-depleted geothermal brine into lower-temperature geothermal vapor comprising lower-temperature steam and non-condensable gases, and further heat-depleted geothermal brine;
   a second vaporizer for receiving the lower-temperature geothermal vapor and vaporizing a preheated second motive fluid using heat from the lower-temperature geothermal vapor to produce second heat-depleted geothermal vapor and vaporized second motive fluid, wherein the second flash tank is configured to produce lower-temperature geothermal vapor containing a heat content only enough to vaporize the preheated second motive fluid in the second vaporizer;
   a second vapor turbine for receiving and expanding the vaporized second motive fluid, producing power and expanded second vaporized motive fluid;

a condenser for receiving and condensing the expanded second vaporized motive fluid to produce condensed second motive fluid; and a second preheater receiving the condensed second motive fluid, the second heat-depleted geothermal vapor or second condensate and the further heat-depleted geothermal brine, the second preheater heating the condensed second motive fluid using heat from the second heat-depleted geothermal vapor and the further heat-depleted geothermal brine, thereby producing the preheated second motive fluid, further make-up water and still further heat-depleted geothermal brine.

13. A method for producing power from geothermal fluid from two geothermal heat sources, the method comprising:

separating a first geothermal fluid from a first geothermal heat source in a first flash tank into geothermal vapor comprising steam and non-condensable gases, and geothermal brine;

supplying the geothermal vapor to a first vaporizer;

vaporizing a preheated motive fluid in the first vaporizer using heat from the geothermal vapor to produce heat-depleted geothermal vapor or condensate and vaporized motive fluid, wherein the heat content in the geothermal vapor exiting the first flash tank is only enough to vaporize the preheated motive fluid in the first vaporizer;

expanding the vaporized motive fluid in a first vapor turbine producing power and expanded vaporized motive fluid;

condensing the expanded vaporized motive fluid in a first condenser to produce condensed motive fluid;

preheating the condensed motive fluid in a first preheater using heat from the heat-depleted geothermal vapor or condensate, thereby producing the preheated motive fluid and make-up water;

separating a second geothermal fluid from a second geothermal heat source in a separator and supplying separated second geothermal fluid to a second flash tank producing lower-temperature geothermal vapor and lower temperature geothermal brine;

supplying the lower-temperature geothermal vapor to a second vaporizer;

vaporizing a preheated second motive fluid in the second vaporizer using heat from the lower-temperature geothermal vapor to produce second heat-depleted geothermal vapor or condensate and vaporized second motive fluid, wherein the heat content in the lower-temperature geothermal vapor exiting the second flash tank is only enough to vaporize the preheated second motive fluid in the second vaporizer;

expanding the vaporized second motive fluid in a second vapor turbine producing power and expanded second vaporized motive fluid;

condensing the expanded second vaporized motive fluid in a second condenser to produce condensed second motive fluid;

preheating the condensed second motive fluid in a second preheater using heat from the second heat-depleted geothermal vapor or condensate and the lower temperature geothermal brine, thereby producing the preheated second motive fluid, further make-up water and additionally heat-depleted geothermal brine;

wherein said lower temperature geothermal brine is also supplied to said first preheater for preheating said condensed motive fluid using heat from said lower temperature geothermal brine in addition to heat from said heat-depleted geothermal vapor or condensate, thereby producing said preheated motive fluid and heat depleted geothermal brine.

* * * * *